United States Patent [19]

Ore

[11] Patent Number: 4,823,677
[45] Date of Patent: Apr. 25, 1989

[54] BRAKE POWER ASSIST SERVOMOTOR

[75] Inventor: Thomas G. Ore, Portage, Mich.

[73] Assignee: General Electric Company, Pittsfield, Mass.

[21] Appl. No.: 144,902

[22] Filed: Jan. 19, 1988

[51] Int. Cl.$^4$ .................. F15B 9/10; F15B 11/15
[52] U.S. Cl. .............................. 91/49; 91/372; 91/377; 91/410; 188/359
[58] Field of Search ............ 91/8, 25, 26, 49, 51, 91/370, 372, 373, 377, 378, 387, 388, 391 R, 394, 401, 431; 60/547.1, 553; 92/76, 65; 188/358, 359

[56] References Cited

U.S. PATENT DOCUMENTS

| | | | |
|---|---|---|---|
| 1,846,089 | 2/1932 | Davis | 91/47 |
| 1,854,367 | 4/1932 | Bragg et al. | 91/378 |
| 1,921,590 | 8/1933 | Staude | 91/47 |
| 3,075,355 | 1/1963 | Baker | 91/49 |
| 3,327,590 | 6/1967 | Johnson | 91/49 |
| 3,515,031 | 6/1970 | McPherson | 91/49 |
| 3,961,561 | 6/1976 | Knutson | 91/431 X |
| 4,679,680 | 7/1978 | Komatz | 192/85 R |

FOREIGN PATENT DOCUMENTS 359979 3/1962 Switzerland ...................... 92/65

Primary Examiner—Robert E. Garrett
Assistant Examiner—George Kapsalas
Attorney, Agent, or Firm—Bailin L. Kuch; Robert A. Cahill

[57] ABSTRACT

A cylindrical casing accommodates an operator pistion and a power piston separated by a fixed barrier which serves to define with the former a reservoir and with the latter a power chamber. A piston rod affixed to the operator piston extends through the barrier into manual brake actuating relation with the power piston. Hydraulic fluid under pressure is introduced to the reservoir from which it flows through barrier passages, past a check valve, into the power chamber and out through venting ports formed in the piston rod. To apply vehicle brakes linked to the power piston, the operator piston is manually propelled toward the barrier, and the power piston is thus forced away from the barrier by the piston rod, resulting in rapid transfer of hydraulic fluid from the reservoir to the power chamber. The venting ports then close, such that the power chamber is pressurized to exert a brake power assisting hydrostatic force on the power piston. Also included are provisions for developing feedback forces to afford operator brake feel.

17 Claims, 2 Drawing Sheets

BRAKE POWER ASSIST SERVOMOTOR

BACKGROUND OF THE INVENTION

The present invention relates to vehicle brake systems and particularly to power assist actuators for vehicle brakes.

Hydromechanical transmissions for track-laying vehicles, such as military tanks, are presently designed to provide not only propulsion and steering, but braking as well. The massive weight and the high speed capability of modern tanks represents tremendous kinetic energy which must be absorbed by the transmission service brakes. Consequently, the service brakes and their actuating system must be designed to bring the tank to a stop reliably and rapidly in response to reasonable brake actuating forces exerted by the driver. Obviously the extreme situation occurs during a panic stop from maximum speed when millions of foot-pounds of kinetic energy must be absorbed by the transmission service brakes in a matter of seconds. To achieve this, the brake actuating force manually exerted by the drive must be power assisted. The most practical source of service brake actuating power assistance is the transmission lubricating system which pumps oil under pressure to the multiplicity of gears, bearings etc., of the transmission. Thus, ideally a brake power assist unit should be of the hydraulic type. As such, it must be designed to operate effectively based on available oil pressure and supply of the transmission lubricating system.

An additional design consideration is finding available space to accept such hydraulic power assist units. In modern military tanks space external of the transmission is a premium, and it is thus preferable to locate the hydraulic power assist units within the transmission housing, particularly since they rely on the transmission lubricating system for hydraulic power. However available space within the transmission housing is also scarce. Consequently the power assist units, one for each of the right and left output transmission service brakes, must be as compact in design as possible.

In addition, it is important that the power assist units provide a force feedback to the driver in order to impart to the driver a "feel" of the service brakes during braking application. This enables the driver to better control normal deceleration either to merely reduce speed or to come to a complete, non-panic stop.

A further and extremely important design consideration is that there be a direct mechanical force coupling between the brake pedal and the transmission service brakes, such that the driver can effect reasonable deceleration and stoppage by manual effort alone should there be a loss of hydraulic fluid pressure.

SUMMARY OF THE INVENTION

It is accordingly an object of the present invention to provide an improved power assist unit for a vehicle braking system.

Another object is to provide a power assist unit of the above-character for brake power assisting manually exerted brake actuating forces.

A further object is to provide a brake power assist unit of the above-character which is failsafe in that effective vehicle braking can be achieved manually upon failure of the power assisting source.

An additional object is to provide a brake power assist unit of the above-character wherein assisting power may be readily derived from existing hydraulic power sources.

Yet another object is to provide a brake power assist unit of the above-character wherein the vehicle operator is afforded adequate brake feel during brake application to facilitate controlled braking.

A still further object is to provide a brake power assist unit of the above-character which is economical in design, compact in size, and reliable and efficient over a long operating life.

Other objects of the invention will in part be obvious and in part appear hereinafter.

In accordance with the present invention, there is provided a hydraulic power assist unit for vehicle braking systems which comprises a cylindrical casing accommodating a reciprocating operator piston linked to the vehicle brake pedal, a reciprocating power piston linked to the vehicle brake, and an intermediate, fixedly positioned barrier. A hydraulic fluid reservoir is defined between the operator piston and the barrier, while a power chamber is defined between the barrier and the power piston. A piston rod is affixed to the operator piston for axial extension slidingly through the barrier into mechanical actuating relation with the power piston via an intervening resilient member. Hydraulic fluid is continuously introduced under pressure into the reservoir, from which it flows through axial passages in the barrier and a check valve into the power chamber. Under quiescent conditions, hydraulic fluid continuously flows out of the power chamber through venting ports and an axial venting passage formed in the piston rod.

Upon the application of manual braking actuating force, the operator piston is propelled toward the barrier and the power piston away from the barrier to both decrease the reservoir volume and increase the power chamber volume. Hydraulic fluid flows from the reservoir through the barrier passages and check valve to maintain the power chamber filled as its volume increases. The power piston, in addition to actuating the brake, serves as a spool valve in that its actuating movement relative to the piston rod closes off the vent ports and also opens an inlet port through which hydraulic fluid is introduced to pressurize the pressure chamber. A hydraulic force is thus exerted on the power piston to assist the manual force exerted thereon via the operator piston and piston rod in applying a rapidly developing, powerful vehicle brake applying force. Upon release of the brake pedal, the resilient member shifts the position of the power piston relative to the piston rod to open up the vent ports, relieving the pressure in the power chamber. The introduction of pressurized hydraulic fluid into the reservoir expands its volume by forcibly retracting the operator piston. The power piston is retracted by the piston rod to decrease the power chamber volume and ultimately to close off the hydraulic fluid inlet port thereinto.

To provide operator brake feel during brake application, a feed back piston of smaller size than the power piston is captured on the terminal end portion of the piston rod adjacent the power piston. A small passage is formed in the power piston connecting the pressure chamber to a feedback chamber intermediate the power piston and the feedback piston in which the resilient member is located. The high hydraulic pressure in the power chamber is thus communicated to the feedback chamber to provide in conjunction with the resilient member a feedback force which affords the operator a feel of the brakes as they are being applied to decelerate the vehicle.

In the event of the loss of hydraulic fluid pressure, the brake power assist unit of the present invention nevertheless provides for straight-line, axial communication of manual brake actuating forces from the operator piston to the power piston via the intervening piston rod and resilient member to decelerate the vehicle to a stop.

The invention accordingly compresses the features of construction, combination of elements and arrangement of parts which will be exemplified in the construction hereinafter set forth, and the scope of the invention will be indicated in the claims.

BRIEF DESCRIPTION OF THE DRAWINGS

For a fuller understanding of the nature and objects of the invention, reference should be made to the following detailed description taken in conjunction with the accompanying drawing in which.

Corresponding reference numerals refer to like parts throughout the several views of the drawing.

DETAILED DESCRIPTION OF THE PREFERRED EMBODIMENT

Figure 1:
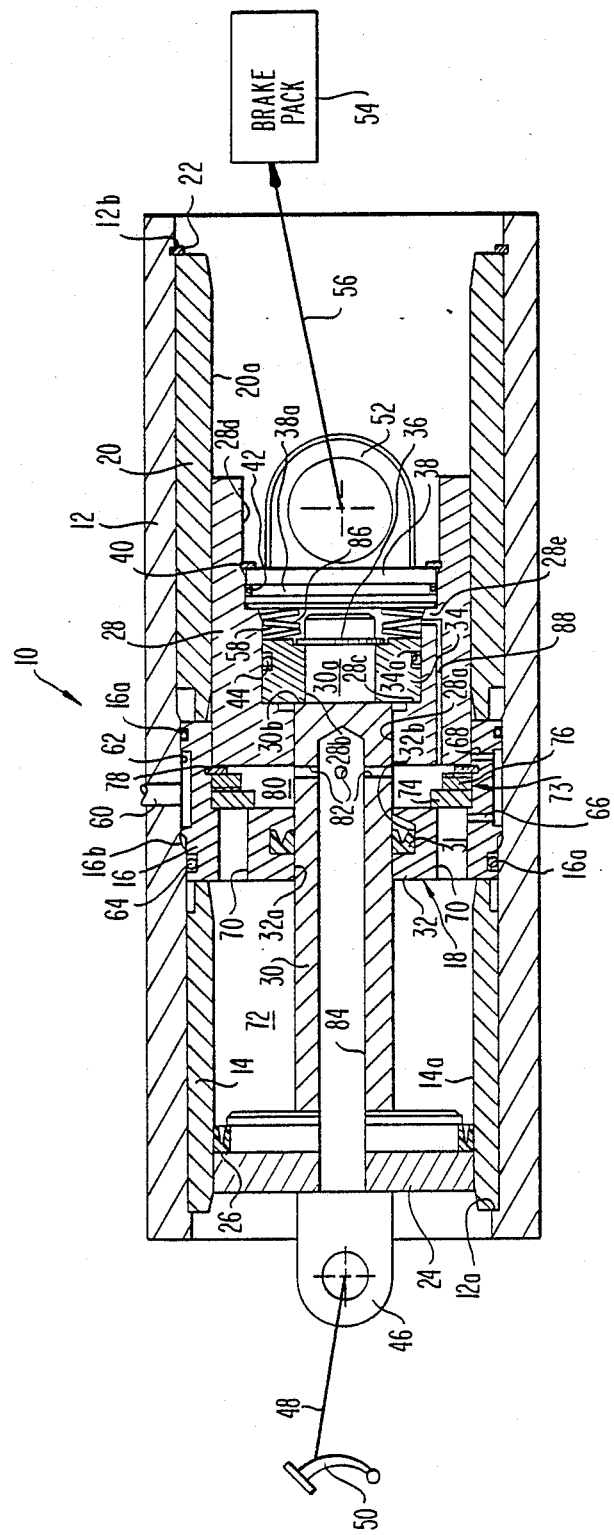
FIG. 1 is an axial sectional view of a brake power assist unit constructed in accordance with the present invention and shown in its unactuated or quiescent condition.

A brake power assist unit constructed in accordance with the present invention and generally indicated at 10 in FIG. 1 includes a cylindrical casing 12 in which are successively slidingly received in close-fitting relation from the right end a first sleeve 14, the rim 16 of a reactor plate generally indicated at 18, and a second sleeve 20. The left end of sleeve 14 abuts a shoulder 12a formed in casing 12, while a snap ring 22 lodged in an annular casing groove 12b maintains this assembly of sleeves 14, 20 and reaction plate 18 in abutting relation within the casing. Sleeve 14 provides a cylindrical bore 14a accommodating a reciprocating operater piston 24 which is fitted with an annular fluid seal 26. The inner surface 20a of sleeve 20 and the inner circumferential surface 16a of reactor plate rim 16 together provide a cylindrical bore accommodating a reciprocating power piston 28.

Integrally formed with operator piston 24 is a piston rod 30 which extends axially through a central opening 32a in the hub 32 of reactor plate 18 and through a central bore 28a into a counter-bored recess 28b, both formed in power piston 28. The passage of piston rod 30 through hub opening 32a is rendered fluid tight by an annular seal 31 accommodated in an annular groove 32b formed in this hub opening. The right end of this piston rod is turned down to provide a reduced diameter terminal portion 30a for receiving a feedback piston 34 which is captured in place against piston rod shoulder 30b by a clip 36 lodged in an annular groove formed in the piston rod terminal portion. Power piston 28 is further counterbored, as indicated at 28d, for receipt of a plate 38 held in abutment against power piston shoulder 28e by a clip 40 lodged in an annular groove cut into this counterbore. An O-ring 42 lodged in a peripheral groove 38a in plate 38 renders its assembly to power piston 28 fluid-tight. In addition, an O-ring 44 accommodated in peripheral groove 34a in feedback piston 34 provides a fluid seal between the feedback piston and power piston counterbore 28b.

Figure 2:
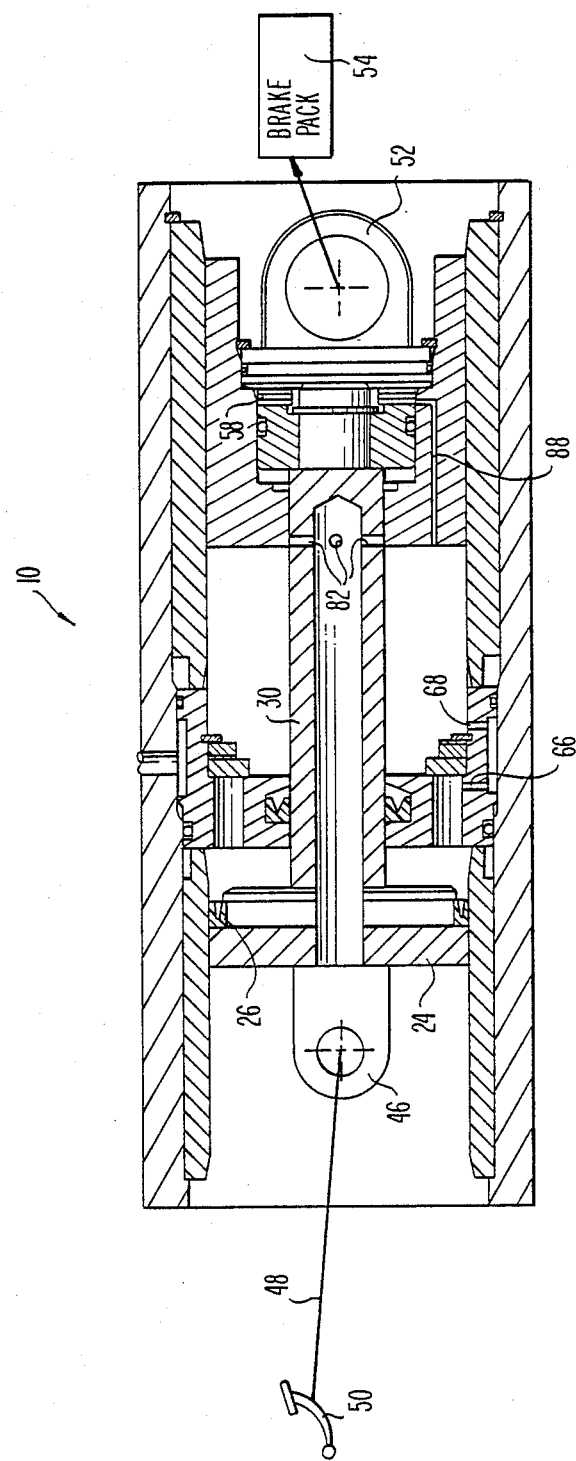
FIG. 2 is an axial sectional view of the brake power assist unit of FIG. 1 shown in its actuated condition.

Still referring to FIG. 1, integrally formed with operator piston 24 is a clevis 46 which is mechanically connected by suitable linkage, diagrammatically indicated at 48, to a vehicle brake pedal 50. Plate 38, fixedly mounted to power piston 28 is integrally formed with a clevis 52, which is mechanically connected to a vehicle brake pack 54 by a linkage, diagrammatically indicated at 56. Interposed between feedback piston 34 and plate 38 is a suitable resilient member or spring 58, which may take the form of a stacked array of Belleville washers. This spring normally biases feedback piston 34 into seated engagement with the shoulder 28c created between power piston bore 28a and counter-bore 28b. It is thus seen that operator depression of brake pedal 50 manually forces operator piston 24 and piston rod 30 to the right as illustrated in FIG. 2. Spring 58 is compressed, and the free end of the piston rod bottoms out against plate 38, forcing power piston 28 to the right to manually actuate brake pack 54 and decelerate the vehicle. Brake power assist unit 10 thus provides, as a failsafe feature, a direct, straightline application of manual brake actuating forces from input clevis 46 to output clevis 52 should there be a failure in the brake assisting hydraulic power source utilized by unit 10.

Considering the hydraulic power aspects of the present invention, a feed line 60 leading from a source (not shown) of hydraulic fluid under pressure is introduced through casing 12 into an annular passage 62 milled in the peripheral surface of reactor plate rim 16. This source may be the lubrication system for a hydromechanical transmission in a track-laying vehicle. O-rings 64 situated in annular grooves 16a cut into the rim peripheral surface in flanking relation to passage 62 prevents fluid leakage therefrom. Passage 62 communicates with a pair of axially spaced, radially directed ports 66 and 68, the former opening into one of a plurality of axially extending passages 70 through hub 32 of reactor plate 18. The other port 68 is closed off by power piston 28 while brake power assist unit is in its quiescent or unactuated condition of FIG. 1. Pressurized hydraulic fluid introduced into passages 70 first fills a reservoir 72 defined between operator piston 24 and reactor plate 18. The right ends of passages 70 are closed off by check valve, generally indicated at 73 and comprising an annular porting plate 74 and a suitable resilient member 76, such as an annular wave spring, which biases the porting plate against reactor plate hub 32. This spring is backed by a clip ring 78 lodged in an annular groove 16b formed in the rim inner circumferential surface. This clip also serves as a stop defining the retracted or home positions for the power and operator pistons while power assist unit resides in its unactuated condition of FIG. 1. When the fluid pressure in reservoir 70 achieves a predetermined nominal level, check valve 73 opens to permit hydraulic fluid flow through passages 70 into a power chamber 80 defined between reactor plate 18 and power piston 28.

To accommodate continuous hydraulic fluid flow from feed line 60 through reservoir 72, passages 70 and power chamber 80, piston rod 30 is provided with a plurality of angularly spaced, radially directed venting ports 82 which open at their inner ends into an axially extending venting passage 84 drilled through operator piston 24 and into the piston rod. With power assist unit in its unactuated condition, it is seen in FIG. 1 that the outer ends of these ports 82 are in open communication with power chamber 80. Thus hydraulic fluid is vented with minimal pressure drop from the power chamber via ports 82 and passage 84 to the sump of the transmission in which power assist unit 10 is installed as fast as hydraulic fluid is being introduced from reservoir 72. It is thus seen that while the power assist unit is in its unactuated condition of FIG. 1, reservoir 72, passages 70 and power chamber 80 are at all times maintained completely filled with hydraulic fluid. In accordance a feature of the present invention there is also provided a feedback chamber 86 which is defined between feedback piston 34 and plate 38. This chamber is in fluid communication with power chamber 80 via a passage 88 drilled in power piston 28. Thus the feedback chamber is also substantially filled with hydraulic fluid as the power assist unit 10 stands ready to actuate brake pack 54.

To execute a braking function the vehicle operator depresses brake pedal 50, forcing operator piston 24 and piston rod 30 rightward toward their fully actuated or extended positions seen in FIG. 2. The volume of reservoir 72 is decreased and hydraulic fluid is forced through passages 70 and past porting plate 74 into power chamber 80 at a much higher volumetric flow rate than could be practically achieved via feed line 60 alone to keep up with the rapidly expanding power chamber volume. It will be noted that the resulting rightward movement of power piston 28 uncovers port 68 and thus the hydraulic fluid input from feed line 60 does contribute to a minor extent to filling the expanding power chamber volume. As the operator increases the actuating force on piston 24, spring 58 between feedback piston 34 and plate 38 compresses. The resulting relative movement between piston rod 30 and power piston 28 closes off venting ports 82, and the continuing input feed of hydraulic fluid through port 68 raises the pressure of the hydraulic fluid in power chamber 80 as porting plate 74 closes off passages 70. This increasing hydraulic pressure acts on power piston 28 to develop a hydrostatic braking force supplementing the manual braking force exerted by the operator for rapid and powerful braking action.

To afford the operator a positive feel of this braking action, the high hydraulic pressure in power chamber 80 is communicated to feedback chamber 86 via passage 88 to exert a hydrostatic feedback force supplementing the feedback force of spring 58. By virtue of these feedback forces, the operator has a sense of the brake actuating force and can adjust brake pedal pressure accordingly to achieve the desired rate of vehicle deceleration called for by the driving situation being confronted.

To disengage brake pack 54, the operator releases brake pedal 50, and spring 58 bias feedback piston 34 to its seated position against shoulder 28c between power piston bore 28a and counterbore 28b. This shifts the position of piston rod 30 in piston bore 28a to open up venting ports 82, rapidly releiving the pressure in power chamber 80. The introduction of hydraulic fluid through input port 66 increases the pressure in reservoir 72 forcing operator piston leftward, which, via piston rod 30 pulls power piston 28 to the left. The volume of reservoir 72 increases as the volume of power chamber 80 decreases; hydraulic fluid being vented from the latter as a significantly faster rate than is being introduced via inlet port 68. In short order, the operator and power pistons are returned to their home positions of FIG. 1 with reservoir 72 and power chamber 80 at their maximum and minimum volumes, respectively. In returning to its home position, power piston 28 closes off inlet port 68, and power assist unit assumes its standby or rest condition with hydraulic fluid being continuously introduced via inlet port 66 into reservoir 72, from which it flows into power chamber 80 and out through venting ports 82 and venting passage 84 to the atmospheric pressure of the transmission sump.

From the foregoing description it is seen that power piston 28, in addition to applying hydraulic power assist forces to brake pack 54, also serves in the nature of a spool valve in effecting the coordinated opening and closing of venting ports 82 and inlet port 68.

As noted above, brake power assist unit 10 is failsafe in that manual brake actuating forces exerted by the operator are nevertheless transmitted to the vehicle brake pack in the event of loss of hydraulic pressure. In this case, as the operator piston 24 is forced rightward by the operator, spring 58 is compressed and the free end of the piston rod 30 bottoms out against plate 38. Power piston 28 is thus driven to the right to actuate brake pack 54, bringing the vehicle to a stop. The volume of reservoir 72 is decreased, and hydraulic fluid is simply pumped from the reservoir through passages 70 into power chamber 80 to fill its increasing volume as the power piston moves rightward. Thus, the presence of hydraulic fluid in the reservoir does not impede the mechanical application of braking action by operator exertion alone.

From the foregoing description, it is seen that the objects set forth above, including those made apparent therein, are efficiently attained, and, since certain changes may be made in the disclosed embodiment without departing from the scope of the invention, it is intended that all matter contained in the above description and shown in the accompanying drawing be interpreted as illustrative and not in a limiting sense.

I claim:

1. A brake power assist unit comprising, in combination:

A. a cylindrical casing;
B. a manually actuatable first piston slidingly received in one end of said casing;
C. a second piston slidingly received in the other end of said casing, said second piston including means for mechanical connection to a brake actuator;
D. a barrier plate fixedly mounted within said casing to define with said first piston a hydraulic fluid reservoir and to define with said second piston a power chamber, said barrier plate including a central opening and at least one passage connecting said reservoir and chamber in fluid communication;
E. a piston rod affixed to said first piston and extending slidingly through said barrier plate opening to a terminal portion disposed in brake actuating relation with said second piston;
F. inlet means for continuously introducing hydraulic fluid under pressure to said reservoir;
G. a check valve positioned to permit unidirection flow of hydraulic fluid through said barrier plate passage from said reservoir to said chamber;
H. first valve means for selectively venting hydraulic fluid from said chamber; and
I. second valve means for selectively pressurizing hydraulic fluid in said chamber from said inlet means;
J. whereby, upon manual actuation of said first piston causing said piston rod to exert a mechanical brake actuating force on said second piston, said reservoir fluid volume is decreased to force hydraulic fluid through said barrier plate passage into said chamber, said first valve means closes, and said second valve means opens to pressurize said chamber, thus to exert an assisting hydrostatic brake actuating force on said second piston.

2. The brake power assist unit defined in claim 1, wherein said first valve means includes at least one venting port communicating with a venting passage, said venting port and venting passage being formed in said piston rod.

3. The brake power assist unit defined in claim 2, wherein said venting port is selectively opened and closed by relative motion between said piston rod and said second piston.

4. The brake power assist unit defined in claim 3, wherein said second valve means includes an inlet port connecting said inlet means and said chamber in fluid communication, said second piston operating to selectively open and close said inlet port.

5. The brake power assist unit defined in claim 1, wherein said second piston is formed having a central bore opening into a recess, said piston rod extending through said bore to situate said terminal portion thereof in said recess, said power assist unit further including resilient means disposed in said recess and acting between said second piston and said piston rod.

6. The brake power assist unit defined in claim 5, which further includes a third piston affixed on said piston rod terminal portion, said resilient means acting between said third piston and said second piston, and a fluid passage connecting said chamber with said recess, whereby, upon pressurization of said chamber, said recess is also pressurized to exert a hydrostatic feedback force on said third piston.

7. The brake power assist unit defined in claim 6, wherein said first valve means includes at least one venting port communicating with a venting passage, said venting port and venting passage being formed in said piston rod.

8. The brake power assist unit defined in claim 7, wherein said venting port is closed off by said second piston bore as said resilient means yields to accommodate relative motion of said piston rod and said second piston in response to manual actuation of said first piston.

9. The brake power assist unit defined in claim 8, wherein said second valve means includes an inlet port connecting said inlet means and said chamber in fluid communication, said second piston closing off said inlet port in the absence of manual actuation of said first piston.

10. The brake power assist unit defined in claim 1, wherein said barrier plate passage accommodates a substantially greater rate of hydraulic fluid flow into said chamber than does said inlet means by way of said second valve means.

11. A brake power assist unit comprising, in combination:
A. a cylindrical casing;
B. a manually actuatable first piston slidingly received in said casing;
C. a second piston slidingly received in said casing, said second piston including means for mechanical connection to a vehicle brake actuator;
D. a barrier fixedly mounted within said casing to define with said first piston a hydraulic fluid reservoir and to define with said second piston a power chamber, said barrier including at least one passage connecting said reservoir and power chamber in fluid communication;
E. a piston rod affixed to said first piston and extending slidingly through said barrier to a terminal portion disposed in manual brake actuating relation with said second piston;
F. inlet means for introducing hydraulic fluid under pressure to said reservoir and said power chamber;
G. a check valve positioned to permit unidirectional flow of hydraulic fluid through said barrier passage from said reservoir to said power chamber; and
H. means for selectively venting hydraulic fluid from said power chamber; and
I. whereby, upon manual actuation of said first piston causing said piston rod to exert a mechanical brake actuating force on said second piston, said reservoir fluid volume is decreased to force hydraulic fluid through said barrier passage into said power chamber, and said venting means closes to enable pressurization of the hydraulic fluid in said power chamber from said inlet means, thus to exert an assisting hydrostatic brake actuating force on said second piston.

12. The brake power assist unit defined in claim 11, which further includes means disposed intermediate said second piston and said piston rod terminal portion for exerting a feedback force on said first piston proportional to the brake actuating force exerted by said second piston.

13. The brake power assist unit defined in claim 12, wherein said feedback force exerting means includes a third piston affixed on said piston rod terminal portion, a feedback chamber defined between said second and third pistons, and a feedback passage connecting said power and feedback chambers in hydraulic fluid communication, whereby said feedback chamber is also pressurized from said inlet means to exert a hydrostatic feedback force on said first piston via said third piston and said piston rod.

14. The brake power assist unit defined in claim 13, wherein said feedback force exerting means further includes a spring situated in said feedback chamber between said second and third pistons and acting in concert with said hydrostatic feedback force.

15. The brake power assist unit defined in claim 14, wherein said venting means includes at least one venting port formed in said piston rod.

16. The brake power assist unit defined in claim 15, wherein said spring biases said second piston and said piston rod to a predetermined unactuated positional relationship wherein said venting port is open to said power chamber, said spring yields in response to manual actuation of said first piston to produce relative motion between said second piston and said piston rod wherein said venting port is closed off by said second piston.

17. The brake power assist unit defined in claim 16, wherein said inlet means includes an inlet port communicating with said power chamber, said second piston closing off said inlet port in the absence of manual actuation of said first piston and opening up said inlet port upon movement in response to manual actuation of said first piston.

* * * * *